(12) United States Patent
Schnell

(10) Patent No.: US 6,194,872 B1
(45) Date of Patent: Feb. 27, 2001

(54) METHOD AND SYSTEM FOR BATTERY ISOLATION DURING SHIPMENT

(75) Inventor: Arnold Thomas Schnell, Pflugerville, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/344,092

(22) Filed: Jun. 25, 1999

(51) Int. Cl.$^7$ .................................................. H02J 7/00
(52) U.S. Cl. .......................................... 320/136; 320/135
(58) Field of Search .................................. 320/136, 135, 320/132, 127, 128, 134

(56) References Cited

U.S. PATENT DOCUMENTS

| 5,028,806 | 7/1991 | Stewart et al. ........................... 307/66 |
| 5,140,250 | 8/1992 | Morland ................................. 320/136 |
| 5,179,337 | 1/1993 | Staarman et al. ..................... 320/136 |
| 5,309,031 | 5/1994 | Stewart et al. ........................... 307/66 |
| 5,343,137 | 8/1994 | Kitaoka et al. ........................ 320/132 |
| 5,418,444 | 5/1995 | Cook et al. ............................ 320/125 |
| 5,576,686 | 11/1996 | Westermeir et al. ................. 340/426 |
| 5,604,708 | 2/1997 | Helms et al. .......................... 365/229 |
| 5,621,298 | 4/1997 | Harvey ................................... 320/134 |
| 5,691,619 | 11/1997 | Vingsbo ................................. 320/136 |
| 5,777,454 | 7/1998 | McAndrews et al. .................. 320/51 |
| 5,831,351 | 11/1998 | Khosrowpour et al. ............. 307/139 |
| 5,847,358 | 12/1998 | Franke et al. ..................... 219/121.67 |
| 5,856,738 | 1/1999 | Yoshimatsu .......................... 320/136 |
| 5,896,025 | 4/1999 | Yamaguchi et al. ................. 320/134 |
| 5,948,076 | * 9/1999 | Anubolu et al. ......................... 710/8 |
| 5,958,054 | * 9/1999 | O'Connor et al. ..................... 307/64 |
| 5,998,972 | * 12/1999 | Gong .................................... 320/134 |

* cited by examiner

Primary Examiner—Peter S. Wong
Assistant Examiner—Lawrence Luk
(74) Attorney, Agent, or Firm—Baker Botts L.L.P.

(57) ABSTRACT

A method and system for selectively isolating in a computer system a local battery in a system component from its associated load. Controls signals are provided to the circuit. In a shipment mode, the control signals prevent the local battery from being coupled to the load of the associated system component. The control signals of the circuit are set to shipment mode at the time the computer system leaves the manufacturing facility for shipment to the customer. When the computer system arrives at the customer's site, the control signals of the circuit are reset from shipment. At the customer's site, the control signals of the circuit control the circuit in such a manner that the circuit will couple the local battery to the load of its associated system element upon the loss of main power to the computer system.

12 Claims, 1 Drawing Sheet

METHOD AND SYSTEM FOR BATTERY ISOLATION DURING SHIPMENT

TECHNICAL FIELD OF THE INVENTION

The present invention relates in general to the shipment of components of computer systems, and, more particularly, to a method and system for local battery isolation during shipment.

BACKGROUND OF THE INVENTION

In computer systems, local direct current batteries may provide backup power to certain portions of the computer system. A battery can be described as local if it supplies power to only a component or collection of components in the computer system.

As an example, a RAID card of a server system may include a local battery that provides backup power to a local cache of the RAID card. A RAID card is typically coupled to the PCI slot of a server system or may be integrated into the motherboard through the PCI bus of such a system. A RAID card acts as a RAID controller, controlling the operation of the array of drives that comprise the RAID subsystem. The operation of the server system and the RAID subsystem often requires that the RAID card coordinate writes of data to the drives of the RAID subsystem. To facilitate the writing of data to the drives of the RAID subsystem, a RAID card will often include a local cache. When writing data from the RAID card to a drive of the RAID subsystem, it is preferable that the data be sent in burst format, rather than as isolated, individual writes to a drive of the drive array. To transmit data in burst format to a drive of the RAID subsystem, it is useful to collect or cache up the data in the local cache located on the RAID card. Because the local cache of the RAID card may, for a limited period, store data that has not yet been written to a drive of the RAID subsystem, the RAID card will include a local battery that is coupled to the cache of the RAID card. The presence of the local battery provides backup power to the cache in the event of a power loss to the RAID card. In this manner, if there is a loss of power to the RAID card, the presence of the local battery that is coupled to the cache of the RAID card insures that the volatile data stored in the local cache is not lost.

As a second example of the use of local batteries for system components, Dell Computer's Remote Administration Card (DRAC) may also include a local battery. In operation the DRAC card plugs into a PCI slot of a server system. A DRAC card is a diagnostic tool that assists Dell or other qualified support personnel with the provision of technical support to the server system. If the server becomes inoperable for some reason, diagnostic equipment may be coupled to the DRAC card to diagnosis the failure in the server. The local battery in the DRAC card allows the DRAC card and its associated diagnosis function to operate even in the case of a power failure to the server. In this manner, even if the server has lost power, the DRAC card will operate from its local battery to allow the diagnosis of the failure experienced by the server. The DRAC card also allows for administration or operation of a server from a remote site. According to this function, a remote user can control certain functions of the server from a remote site.

One difficulty presented by a local battery is the possible of battery dissipation following manufacture and prior to receipt of the computer system by the customer. The dissipation of a local battery can occur following manufacture and during shipment. Local batteries are often charged during the manufacturing process. The manufacturing process may also result in the battery being coupled to its load. In this manner, once the A/C power source to the server system is removed following the testing of the server system at the manufacturer's site, the local battery will attempt to supply power to the load. Over time, if the local battery remains connected to the load in the absence of an A/C power source to the server system, the local battery will dissipate and may arrive at the customer in an uncharged condition.

When the computer system is shipped to the customer, it is desirable that any local batteries arrive at the customer in a charged condition. If a local batteries do not arrive at the customer in a charged and functional condition, the backup capability that was intended to be provided by the local battery is compromised or missing entirely. In the case of the RAID card, for example, the RAID card will begin to collect data in the local cache immediately upon operation of the server and RAID subsystem. Recharging of the local battery of a RAID card will typically take between four and eight hours. If the local battery of the RAID card is not yet recharged and the RAID card suffers a power loss during its initial several hours of operation, any data in the local cache may be lost. In this example, because the local battery was discharged during shipment, a sudden loss of power occurring prior to the time when the local battery was recharged at the customer's site may result in the loss of data. In the case of a DRAC card, if the local battery of the DRAC card is not charged at the time the system reaches the customer, the DRAC card will not be functional if there is a loss of power to the server system that occurs prior to the time the local battery of the DRAC card is recharged. For these reasons, it is desirable that local batteries of the computer system not be discharged during manufacturing or shipment, but instead arrive at the customer in a charged condition.

To avoid discharge of a backup battery during shipment, one possible solution is to physically disconnect the battery from its load during shipment. Although an uncoupled battery will experience some residual dissipation, the dissipation will be much less than the relatively quick dissipation experienced by a battery that is coupled to its load during shipment. Third party manufacturers of RAID controllers, for example, often physically disconnect the local battery from the RAID controller prior to shipment. The customer or user, upon receipt of the RAID controller, will have to physically reconnect the local battery to the RAID card at the time of installation of the RAID card in the server system.

In the case of integrated computer systems, however, physically disconnecting and physically connecting a local battery to its load is not a preferable solution. First, such a solution requires significant, and undesirable, customer involvement in the installation process. According to such a solution, the user would be required to open the computer system and make the necessary connection as part of the user's installation process. This process would require considerable skill on the part of the user in opening the computer system, locating the affected component, making the necessary connection, and closing the computer system without damaging any elements of the computer system. Second, such a solution would require that the battery be physically disconnected during the manufacturing process. After a Dell computer system is fully assembled, including the connection of the local batteries to their respective loads, the system goes through a quick test and an extended test procedure. Following a successful test, it is desirable that the systems not be physically opened thereafter. Leaving the case of the computer system closed following the quick test and extended test procedures insures that no configuration changes are made to the system and that the system that is actually shipped to the customer is the same system that passed all required testing procedures. Thus, once the local batteries have been coupled to their loads and the test procedures have been successfully completed, opening the system to physically uncouple the local batteries would compromise the configuration and testing integrity of the computer system.

SUMMARY OF THE INVENTION

A method and system for selectively isolating a local battery is disclosed that provides significant advantages over prior battery isolation techniques. The battery isolation circuit allows for battery isolation with minimal assistance from the customer.

A battery isolation circuit is provided that selectively isolates the local battery from the load of its associated system component. The isolation circuit includes logical inputs that indicate whether the local battery is to be coupled to the load of its associated system component in the event of a loss of power that is provided from the main power supply. In one mode, the inputs to the logic circuitry provide that the local battery is to be coupled to the load of its associated system component in the event of a loss of main power to the computer system. In another mode, known as shipment mode, the inputs to the logic circuitry provide that the local battery is to remain isolated from the load of its associated system component, even in the event of a loss of power to the computer system. The shipment mode protects the local battery from dissipation and consequent damage during shipment.

It is a technical advantage of the battery isolation system and method to provide an isolation circuit that can selectively isolate and couple a local battery to a load of an associated system component depending on the operating mode of the computer system. In this manner, the isolation circuit can isolate the local battery during shipment of the computer system from the manufacturing site to the customer's site.

Another technical advantage of the battery isolation system and method is a method for selectively isolating the battery that requires little, if any, involvement of the customer. The battery is isolated at the time the computer system leaves the manufacturing site. When the computer system is first powered up, the control signals are reset such that the battery is capable of being coupled to the load of the associated system component in the event of a failure of the main power supply to the computer system.

Another technical advantage of the battery isolation system and method disclosed herein is the provision of a computer system that does not involve the physical decoupling of the local battery to achieve battery isolation. In this manner, the involvement of the customer is minimized, as discussed above, and testing technicians need not open the cabinet of the computer system following testing to physically disconnect the local battery for shipment.

It is another technical advantage of the battery isolation system and method that the control settings to isolate the battery can be set by the user in the event that the computer system must be moved from one location to another. In this manner, the user can isolate the battery when it is desired to remove main power to the computer system in the event that the computer system is relocated. The user can manipulate the control settings in BIOS, eliminating the need to physically disconnect the local battery.

Other technical advantages should be apparent to one of ordinary skill in the art in view of the specification claims, and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
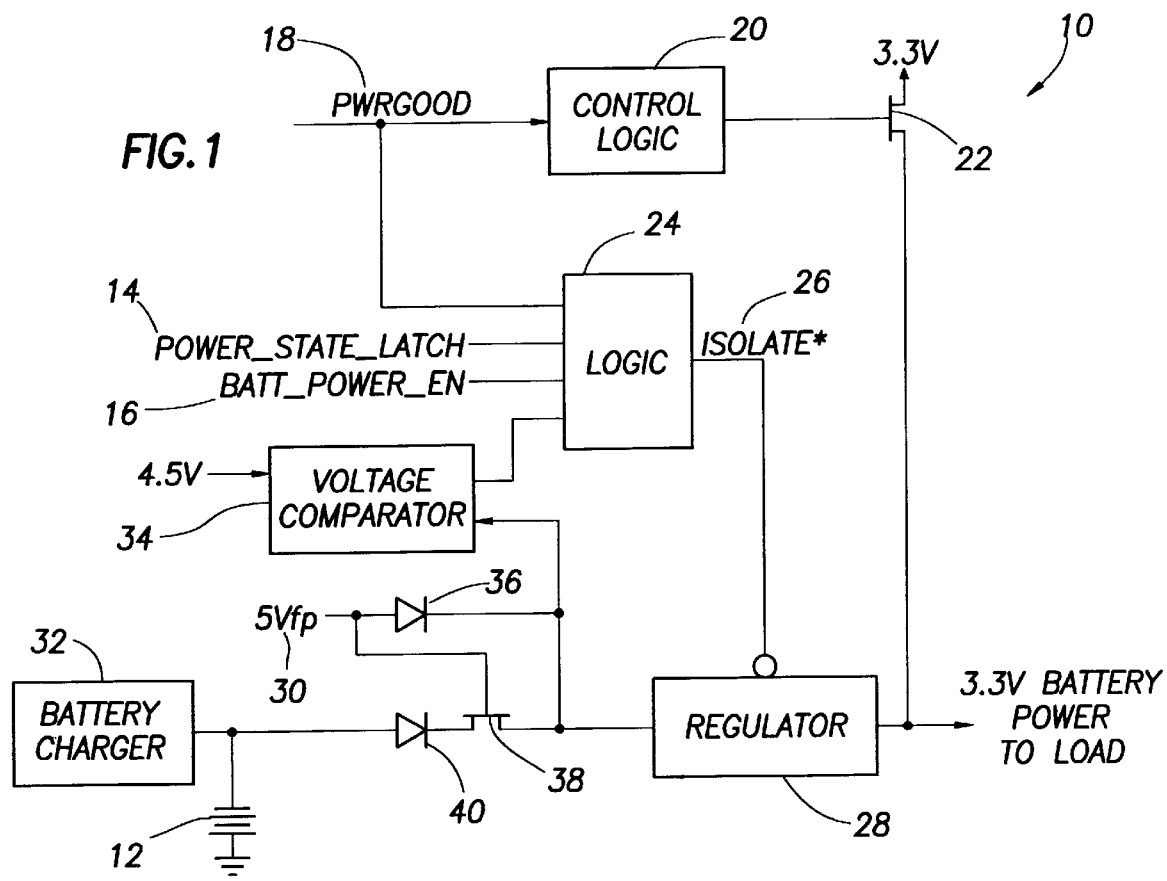
FIG. 1 is a diagram of an embodiment of selective selection isolation circuit of the present invention.

A selective isolation is indicated generally at 10 in FIG. 1. Selective isolation circuit 10 isolates a local battery 12 from the load of the circuit 10 under certain conditions. In the embodiment of the selective isolation circuit 10 of FIG. 1, local battery 12 is comprised of 5 AA cells, together having a nominal voltage of 6 volts. The selective isolation circuit includes circuitry that isolates the battery when the nominal voltage of the battery has fallen below a threshold level. Circuit 10 recognizes the condition under which the server system has experienced an unexpected loss of A/C power, in which case the loss must be compensated for by battery 12 of circuit 10. In the example of FIG. 1, the load may comprise the circuitry of the system component that is to remain operational if there is an unexpected and prolong loss of A/C power to the server system.

One input to circuit 10 is a PWRGOOD signal 18, which is coupled to logic circuitry 20. PWRGOOD signal 18 is an existing signal from the main power supply of the server system. PWRGOOD signal 18 is a logical 1 or true when power is being supplied to the server system from the main power supply. In normal operating conditions, when the server system is coupled to its A/C power source, PWRGOOD signal 18 is a logical 1. When PWRGOOD signal 18 is a logical 1, logic circuitry 20 outputs a high voltage to the gate of field effect transistor (FET) 22. The application of a high voltage level to FET 22 causes FET 22 to go into saturation, shorting a voltage of 3.3 volts to the load of circuit 10. The 3.3 volt potential is obtained from the main voltage supply of the server system. PWRGOOD signal 18 is also coupled to logic circuitry 24. Logic circuitry 24 outputs an Isolate* signal 26. Isolate* signal 26 is coupled to a shut-down pin of regulator 28. When PWRGOOD signal 18 is a logical 1, Isolate* signal 26 is a logical 0, causing the shut-down pin of regulator 28 to turn off. In summary, when the server system is drawing A/C power from its A/C power source under normal operating conditions, PWRGOOD signal 18 shorts the load of circuit 10 to a 3.3 volt power source supplied by the main power supply. At the same time, PWRGOOD signal 18 causes regulator 28 to be in shut-down mode, thereby isolating battery 12 from the load of circuit 10.

If the server system loses power from its A/C power source, PWRGOOD signal 18 becomes a logical 0. Once PWRGOOD signal 18 becomes a logical 0, indicating that the server system is not receiving power from its A/C power supply, power must be supplied to the load of circuit 10 through local battery 12 or backup power supply 30. Backup power supply 30 provides a small amount of residual power that exists in the main power supply of a server system for a short period of time following the loss of A/C power to the server system. Backup power supply 30 typically has a voltage level that is less than that of local battery 12.

The selective isolation circuit 10 includes a Power_State_Latch signal 14 that is an input to logic circuitry 24. Power_State_Latch signal 14 already exists in many server systems and identifies the state of the system upon the loss of A/C power to the server system. Unlike most personal computer systems, server systems are designed to return to operation after an unexpected loss of A/C power. If a server system is in normal operation and A/C power to the server system is lost, Power_State_Latch signal 14 will be set to a logical 1. When A/C power is returned to the server system, the system detects the state of Power_State_Latch signal 14. A logical 1 in Power_State_Latch signal 14 causes the server system to turn itself on and continue operating as before the unexpected loss of A/C power. In contrast, if the server system is off and not operating when A/C power is removed from the server system, such as by removal of the power cord to the wall outlet, Power_State_Latch signal 14 will be set to a logical 0. When A/C power is returned to the server system, such as by returning the power cord to the wall outlet, the logical 0 of Power_State_Latch signal 14 indicates to the server system that the system is not to turn itself on to begin operation. In this manner, Power_State_Latch signal 14 identifies whether the server system has experienced an unexpected loss of A/C power during otherwise normal operation (logical 1) or whether the loss of A/C power was expected and during a period in which the server system was off (logical 0).

The selective isolation circuit 10 also uses a Batt_Power_En signal 16. Batt_Power_En signal 16 is a signal that is provided to selective isolation circuit 10 by the BIOS of the server system. Selective isolation circuit 10 operates such that when Batt_Power_En signal 16 is set to a logical 0, local battery 12 is isolated from the load of circuit 10.

Local battery 12 is coupled to a battery charger 32 and a diode 40. Diode 40 is coupled to the drain of FET 38. The gate of FET 38 is coupled to backup power supply 30 and diode 36. Backup power supply 30 is coupled to voltage comparator 34 and regulator 28 across diode 36. Battery charger 32 charges local battery 12. Voltage comparator 34 compares the voltage level of backup power supply 30 across diode 36 to a voltage level of 4.5 volts. The output of voltage comparator 34 is coupled to an input of logic circuitry 24. When the voltage level at the source of FET 38 drops below 4.5 volts and backup power 30 is not present, voltage comparator 34 outputs a logical 1 to an input of logic circuitry 24. In all other instances, voltage comparator 34 outputs a logical 0 to the input of logic circuitry 24. When the input of logic circuitry 24 from voltage comparator 34 is a logical 1, the output of logical circuitry 24, Isolate* signal 26, is a logical 0. The output of a logical 0 from logic circuitry 24 to the activate pin of regulator 28 causes regulator 28 to turn off, thereby isolating local battery 12 from the load of circuit 10. Voltage comparator 34 and FET 38 act as a protective circuit, isolating local battery 12 and protecting it from permanent damage when its voltage drops below a threshold voltage level.

In those instances when PWRGOOD signal 18 is at a logical 0 and when the output of voltage comparator 34 is a logical 0, whether local battery 12 and backup power supply 30 are isolated from the load of circuit 10 depends upon the value of Power_State_Latch signal 14 and Batt_Power_En signal 16. If, in a first example, Power_State_Latch signal 14 is at a logical 0 (indicating that the server system was off when A/C power was removed) and Batt_Power_En signal 16 is at a logical 0 (indicating that local battery 12 is not to be coupled to the load upon the loss of A/C power), Isolate* will be set to a logical 0, causing local battery 12 and backup power supply 30 to be isolated from the load of circuit 10. Regulator 28 will be shut down in this case. This setting for Power_State_Latch signal 14 and Batt_Power_En signal 16 is the preferred case for shipment of the server system following the successful testing of the server system. In this case, a technician has set the Batt_Power_En signal to a logical 0 when the server system has passed all required testing procedures and is ready for shipment. After the system is powered down by the technician, A/C power is removed from the server system, which causes Power_State_Latch signal 14 to go to a logical 0. In this condition, local battery 12 is isolated from the load of circuit 10 and arrives at the customer's site in a charged condition.

Assuming in a second possible case that PWRGOOD signal 18 is a logical 0 and that the output of voltage comparator is a logical 0, if Power_State_Latch signal 14 is at a logical 0 and Batt_Power_En is at a logical 1, Isolate* signal 26 will be at a logical 1. When a logical 1 is applied to the shut-down pin of regulator 28, regulator 28 comes on. As a result, regulator 28 is coupled between either of local battery 12 or backup power supply 30 and the load of circuit 10. This is the case in which the computer has arrived at the customer's site, the customer at setup of the server system has enabled the application of the local batteries to system components, and the server system has lost A/C power at a time when the server system was off. In a typical scenario of this case, a customer has shut his server system down and removed the power cord from the wall outlet to physically move the server system from one location to another. In this case, power is supplied through the regulator to the load of circuit 10 from either local battery 12 or backup power supply 30.

Assuming in a third possible case that PWRGOOD signal 18 is a logical 0 and that the output of voltage comparator is a logical 0, if Power_State_Latch signal 14 is at a logical 1 and Batt_Power_En is at a logical 1, Isolate* signal 26 will be at a logical 1. When a logical 1 is applied to the shut-down pin of regulator 28, regulator 28 comes on. As a result, regulator 28 is coupled between either of local battery 12 or backup power supply 30 and the load of circuit 10. This is the case in which the computer system has arrived at the customer's site, the customer at setup of the server system has enabled the application of the local batteries to system components, and the server system has unexpectedly lost A/C power at a time when the server system was on. In a typical scenario of this case, a customer has shut his server system has lost facility power during normal operation. In this case, power is supplied through the regulator to the load of circuit 10 from either local battery 12 or backup power supply 30.

Assuming in a fourth possible case that PWRGOOD signal 18 is a logical 0 and that the output of voltage comparator is a logical 0, if Power_State_Latch signal 14 is at a logical 1 and Batt_Power_En signal 16 is at a logical 0, Isolate* signal 26 will be at a logical 1. When a logical 1 is applied to the shut-down pin of regulator 28, regulator 28 comes on. As a result, regulator 28 is coupled between either of local battery 12 or backup power supply 30 and the load of circuit 10. This case is unlikely to occur, as it would require that the testing technician set the Batt_Power_En signal 16 to a logical 0 for shipment, while at the same time removing A/C power to the server system while the server system was still on. In this case, the loss of A/C power overrides the negation of the Batt_Power_En signal, causing the regulator to come on and connecting local battery 12 or backup power supply 30 to the load of circuit 10.

In those cases where regulator 28 is turned on by Isolate* signal 26 being set at a logical 1, the application of power from local battery 12 or backup power supply 30 is determined by the relative voltages of battery 12 or backup power supply 30. Backup power supply 30 is coupled to the input of regulator 28 and voltage comparator 34 through a diode 36. Backup power supply 30 is also coupled to the gate of FET 38. When backup power supply 30 has a sufficiently high voltage level, the gate and the source of FET 38 are near the same potential and FET 38 turns off, thereby isolating local battery 12 from regulator 28. In this manner, local battery 12 is isolated from regulator 28 so long as power exists in backup power supply voltage 30. When backup power supply voltage falls below a threshold voltage level, FET 38 turns on and local battery 12 is coupled to regulator 28 through diode 40. In this manner, the use of battery 12 is limited to those instances when both the main power supply and the backup power supply 30 cannot provide power to the load of circuit 10.

Although selective isolation circuit 10 has been described in terms of its ability to isolate voltages from the load of circuit 10, the circuit could easily have been described in terms of its ability to selectively couple battery 12 to the load of circuit 10 under certain operating conditions.

Figure 2:
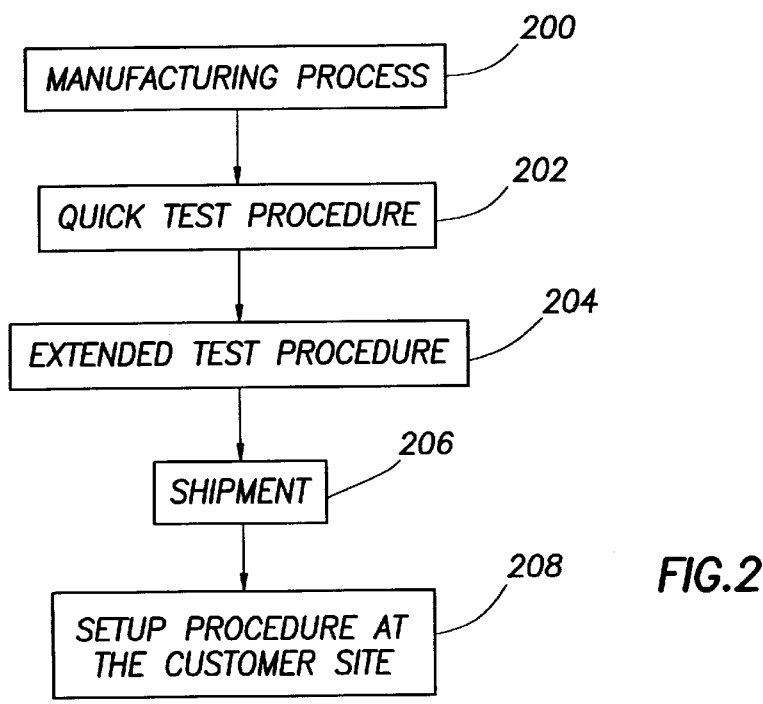
FIG. 2 is a flow diagram of the manufacturing, testing, shipment, and setup process of a computer system that includes a selective isolation circuit.

The present invention also describes a method for charging batteries and for setup at the customer site that does not result in the discharge of local batteries during shipment and prior to setup at the customer site. Shown in FIG. 2 is a flow chart of the manufacturing, testing, shipment, and setup process of the present invention. Shown at step 200 is the manufacturing process, during which the server system is manufactured to the customer's specifications. Following manufacturing step 200 is quick test step 202. The test time for the quick test procedure of step 202 is usually between twenty and thirty minutes. Following the quick test procedure of step 202 is the extended test procedure of step 204. The extended test procedure may last between eight and twelve hours. The local batteries of the server system, including local battery 12, are charged during the time of the quick test 202 and the extended test 204. The local batteries will charge from a battery charging circuit within the server system that provides a voltage potential. At or near the conclusion of the extended test procedure, the test technician will, through BIOS, set the Batt_Power_En signal 16 to a logical 0 and put the system through a normal shutdown and power off procedure. Once the server system has been shut down, the technician will remove A/C power to the server system. In this configuration, because Batt_Power_En signal 16 has been set to a logical 0 and because A/C power to the server system was removed after the system was powered down, the server system is in shipment mode and any local batteries are isolated from their respective loads.

In step 206, the server system is shipped to the customer, and, in step 208, a setup procedure is performed at the customer's site. When the server system is first powered up at the customer's site, Batt_Power_En signal 16 is flipped by the system BIOS as part of the setup procedure to a logical 1 so that the local batteries are no longer isolated from their respective loads. Thus, once the Batt_Power_En signal 16 is set to zero by a technician during testing of the server system, the BIOS of the server system will flip set Batt_Power_En signal 16 to a logical 1 when the server system is next powered on.

As an alternative to automatically setting Batt_Power_En signal 16 to a logical 1 at the time of the first power up following the extended test procedure, the user could be provided with a prompt each time the server system is powered on. This option would allow the user to set Batt_Power_En signal 16 to a logical 1 at the discretion of the user. In this manner, the user will be prompted each time the system is powered up.

As a second alternative to automatically setting Batt_Power_En signal 16 to a logical 1 at the time of the first power up following the extended test procedure, a second signal, Batt_Power_En_Setup, could be established. In this embodiment, the BIOS always sets Batt_Power_En signal 16 to a logical 1 when the server system is powered on, and always sets Batt_Power_En signal 16 to the value of Batt_Power_En_Setup signal when the system is powered down. If the user of the system sets the Batt_Power_En_Setup signal to a logical 0 upon shutdown of the server system, the Batt_Power_En signal 16 will be set to a logical 0 during the time that the system is powered off. The Batt_Power_En signal 16 will remain at a logical 1 until a clean shutdown is verified. If A/C power to the server system is lost unexpectedly after the clean shutdown of the system, Batt_Power_En signal 16 has already been set to logical 0 and the affected local batteries will not provide backup protection. Batt_Power_En_Setup should be set to a logical 0 if the server system is to be disconnected from A/C power, such as when the system is to be physically moved from one location to another. If Batt_Power_En_Setup is set to a logical 1, the local batteries are never isolated from the load, regardless of expected or unexpected shutdowns or A/C power loss. When Batt_Power_En_Setup is set to a logical 1, the battery is allowed to drain until it can no longer provide power. This configuration provides the most complete power protection at the risk of substantially draining the affected local batteries. In sum, setting Batt_Power_En_Setup signal to a logical 1 causes the local battery to connect to the load regardless of the state of A/C power, and setting Batt_Power_En_Setup signal to a logical 0 allows for the disconnection of the local battery from its load after a clean shutdown.

It should also be noted that setting the Batt_Power_En_Setup signal to a logical 1 has the practical effect of allowing the local battery to substantially discharge in a controlled environment, thereby aiding the reconditioning, or recharging, of the battery in those instances in which it is desired to recharge the battery to its original energy storage capacity.

Although this invention has been described in terms of its application to the manufacture and use of server systems, this invention is applicable to any systems having local batteries coupled to system components. This invention provides particular applicability to server systems because of the need for server systems to be in continuous operation and the related need for certain elements to have backup power in the event of the loss of A/C power to the server system. Nevertheless, the present invention will find applicability in any computer system having a local battery.

Although the present invention has been described in detail, it should be understood that various changes, substitutions and alterations can be made thereto without departing from the spirit and scope of the invention as defined by the appended claims.

What is claimed is:

1. A method for isolating a load of a system component from a local battery of a system component of a computer system during shipment of the computer system, comprising the steps of:

manufacturing the computer system;

testing the computer system;

charging the local battery during the testing of the computer system;

setting an isolation circuit to isolate the local battery from the load of the system component;

shutting down the computer system;

removing A/C power from the computer system;

shipping the computer system;

returning A/C power to the computer system; and booting up the computer system, whereby the isolation circuit is reset to selectively couple the local battery to the load of the system component upon the loss of A/C power to the computer system.

2. The method for isolating a load of a system component of claim 1, wherein the step of testing the computer system comprises the step of performing an quick test and an extended test.

3. The method for isolating a load of a system component of claim 1, where, upon bootup of the computer system, the isolation circuit is not reset to selectively couple the local battery to the load of the system component until the computer system receives a response to a prompt provided to a user of the computer system.

4. The method for isolating a load of a system component of claim 1, wherein the computer system is a server system.

5. A selective isolation circuit for selectively coupling and isolating a local battery to and from a load of a system component of a computer system, the isolation circuit comprising:

a main power supply, the main power supply including a voltage potential coupled to the load of the computer system;

a regulator coupled to the computer system, the regulator having a shut-down pin;

logic circuitry having an output coupled to the shut down pin of the regulator;

a local battery coupled to the regulator;

inputs to the logic circuitry; and wherein the regulator operates to pass the voltage of the local battery to the load of the system component only upon receipt of a signal from the logic circuitry causing the regulator to begin operation.

6. The selective isolation circuit of claim 5, wherein the system component of the computer system is a local cache of a RAID card.

7. The selective isolation circuit of claim 5, wherein the logic circuitry includes input signals, the input signals comprising, a first logic input indicating the condition of the main power supply of the computer system;

a second logic input indicating whether the A/C power was most recently removed from the computer system at a time when the computer system was in an on condition or in an off condition; and a third logic input indicating whether the local battery is to be isolated from the load of the system component.

8. The selective isolation circuit of claim 7, wherein the logic circuitry includes a fourth logic input indicating whether the voltage potential of the local battery has fallen below a threshold voltage.

9. The selective isolation circuit of claim 7, wherein the circuit includes a residual backup power supply coupled to the regulator.

10. The selective isolation circuit of claim 7, wherein the residual backup power supply has a higher nominal voltage potential than the local battery.

11. The selective isolation circuit of claim 7, wherein only the local battery or the residual backup power supply having the greater voltage is applied to the regulator.

12. The selective isolation circuit of claim 7, wherein the logic circuitry includes input signals, the input signals comprising, a first logic input indicating the condition of the main power supply of the computer system;

a second logic input indicating whether the A/C power was most recently removed from the computer system at a time when the computer system was in an on condition or in an off condition;

a third logic input indicating whether the local battery is to be isolated from the load of the system component; and a fourth logic input indicating whether the voltage potential of the local battery has fallen below a threshold voltage; and wherein the circuit includes a residual backup power supply coupled to the regulator.

* * * * *